United States Patent [19]

Barstow

[11] 3,738,757
[45] June 12, 1973

[54] REFRACTOMETER

[75] Inventor: Ormond E. Barstow, Midland, Mich.

[73] Assignee: The Dow Chemical Company, Midland, Mich.

[22] Filed: July 2, 1971

[21] Appl. No.: 159,429

[52] U.S. Cl. ............................................. 356/131
[51] Int. Cl. ......................................... G01n 21/46
[58] Field of Search ................. 356/131, 132, 135, 356/136; 250/202, 209, 210

[56] References Cited
UNITED STATES PATENTS

| | | | |
|---|---|---|---|
| 2,624,014 | 12/1952 | Barstow | 356/135 |
| 3,604,937 | 9/1971 | Halm | 250/210 |

Primary Examiner—Ronald L. Wibert
Assistant Examiner—Conrad Clark
Attorney—Earl D. Ayers and Griswold & Burdick

[57] ABSTRACT

This invention relates to an improved recording refractometer of the critical angle type wherein the brightness of the dark field is observed continuously by one reference photocell while another photocell assembly (measuring) scans to find the light-dark dividing line. The electrical outputs of the reference and measuring photocells are coupled to a bridge circuit, amplifier and servo motor which pivots the measuring photocell assembly until the slit adjacent to the measuring cell comes into, and remains in, coincidence with the light-dark boundary. Indicating or recording means coupled mechanically to the measuring photocell assembly shows the refractive index of the sample.

10 Claims, 3 Drawing Figures

PATENTED JUN 12 1973 3,738,757

INVENTOR.
Ormond E. Barstow
BY
Earl D. Ayers
AGENT

REFRACTOMETER

BACKGROUND OF THE INVENTION

This invention relates to refractometers and particularly to recording refractometers of the critical angle type.

Other recording refractometers of the critical angle type are known in the art. One, for example, is described in U.S. Pat. No. 2,624,014 to O. Barstow.

Such devices commonly have "standardizing" mechanisms including timers, solenoids, clutches, potentiometers, for example. Also, measuring is often interrupted when "standardizing."

In at least some of the prior art devices, there is a time delay during use of the device to allow the photocell to come to equilibrium after going from the dark to light field and vice versa.

OBJECTS OF THE INVENTION

Accordingly, a principal object of the invention is to provide an improved refractometer of the critical angle type.

Another object of this invention is to provide an improved, simpler to construct and operate refractometer of the critical angle type.

A further object of this invention is to provide an improved refractometer of the critical angle type which requires no interruption of the measuring function during dark field measurement.

Still another object of this invention is to provide an improved refractometer of the critical angle type which provides compensation for light intensity changes.

STATEMENT OF THE INVENTION

In accordance with this invention, there is provided refractometer apparatus including a suitable light source from which light is directed at a sample receiving vessel in which the sample contacts a surface of a refracting prism, passes through the prism and a lens, and impinges on a partially reflecting plate which reflects a portion of the light to a reference photocell assembly. The remainder of the light from the prism and lens passes through the reflecting plate and impinges on a second reflecting element and thence through a slit and onto a measuring photocell. The second reflecting element, slit and measuring photocell are part of a moveable assembly.

The electrical outputs of the photocells are coupled to a bridge circuit, amplifier and servo motor which pivots the moveable assembly until the slit adjacent to the measuring cell comes into, and remains in, coincidence with the light-dark boundary. Indicating or recording means coupled to the moveable assembly shows the refractive index of the sample.

BRIEF DESCRIPTION OF THE DRAWING

The invention, as well as additional objects and advantages thereof, will best be understood when the following detailed description is read in connection with the accompanying drawing, in which.

Figure 1:
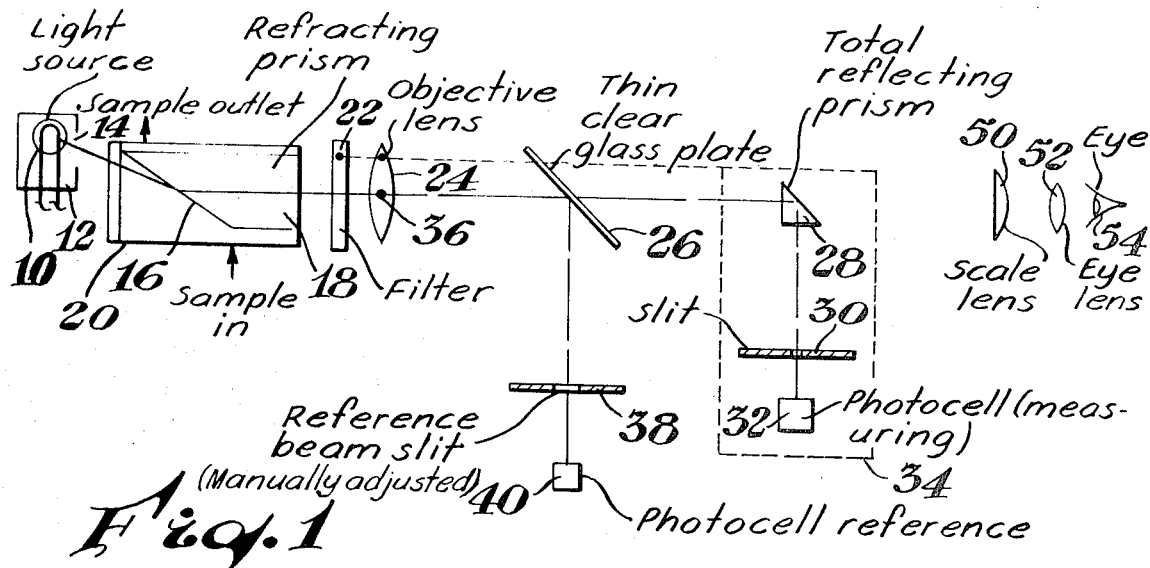
FIG. 1 is a diagrammatic view of mechanical and optical apparatus in accordance with this invention.

Referring to the drawing, and particularly to FIG. 1, there is shown a light source 10, such as an incandescent bulb, for example, enclosed in a suitable housing 12 having a window 14 facing the first surface 16 of a refracting prism 18 which is enclosed in a liquid-tight sample-receiving housing 20.

A band pass filter 22, objective lens 24 and a clear glass plate or semi-silvered beam-splitting mirror element 26 are spaced from and aligned along the longitudinal axis of the refracting prism 18. The filter 22 and objective lens 24 are disposed generally perpendicularly with respect to the longitudinal axis of the prism 18 while the plate 26 is tilted, at 45°, for example, with respect to the longitudinal axis of the prism 18.

A total reflecting prism 28 is disposed beyond and axially aligned with the filter 22 and objective lens at a distance more remote from the refracting prism 18 than is the plate 26.

A slit assembly 30 and measuring photocell 32 are disposed with respect to the prism 28 so that light from the prism 18 which passes through the filter 22, lens 24 and plate 26 is reflected by the prism 28 and focused in the plane of slit 30, some of the light passing through the slit to the photocell 32.

The prism 28, slit 30, and the measuring photocell 32 are mounted on a rigid assembly 34 which is pivoted from a point 36 near the objective lens.

A slit 38 and reference photocell 40 is aligned to receive light reflected from the plate 26.

A scale lens 50 and eye lens 52 are aligned along the axis of the prism 18 and objective lens 24 so that, for checking purposes, an individual may use his eye 54 to visually observe the position of the light-dark boundary, characteristic of a critical angle refractometer, relative to a vertical scale engraved on the scale lens, after the assembly 34 is pivoted out of line.

Figure 2:
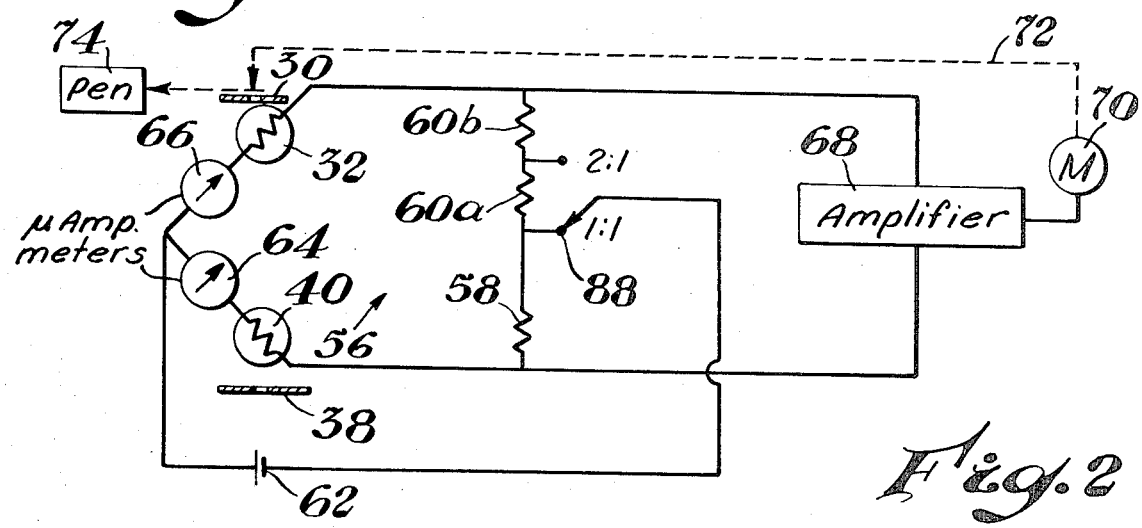
FIG. 2 is a basic, simplified schematic diagram of bridge and slit and pen positioning apparatus for use with the apparatus of FIG. 1.

Referring now to FIG. 2, there is shown a bridge circuit, indicated generally by the numeral 56, composed of photosensitive elements 32, 40 as two legs of the bridge and resistor 58 and resistors 60a, 60b as the other two legs of the bridge. A voltage source, such as the battery 62, is coupled across the junction between the photoresistive elements 32, 40 between meters 64, 66 and between the resistors 58 and 60a.

With switch 88 in the position shown, these two latter legs are equal in resistance since resistor 58 equals the sum of resistors 60a and 60b. These bridge legs have a ratio of 1:1 as indicated in the diagram and the signal to the amplifier will be zero if the currents through the photocells are equal. With switch 88 in the position marked 2:1, the bridge arms have a ratio of 2:1 since the resistance values bear the relation:

Resist 58 + Resist 60a = 2 Resist 60b.

Now the current through photocell 32 has to be twice that through photocell 40 to bring the amplifier signal to zero. The motor will drive the slit 30 (by driving pivoted assembly 34) until it reaches the light-dark boundary and this 2:1 ratio in current exists.

An amplifier 68 has its input coupled across the junctions between the photoresistive elements and the adjacent resistors (58 adjacent to element 40 and 60b adjacent to element 32.) The output of the amplifier 68 is coupled to servo motor 70 which controls the movement of the assembly 34 in FIG. 1 (shown symbolically in FIG. 2 by the dashed line 72 to measuring slit 30) and of the recorder pen 74.

Figure 3:
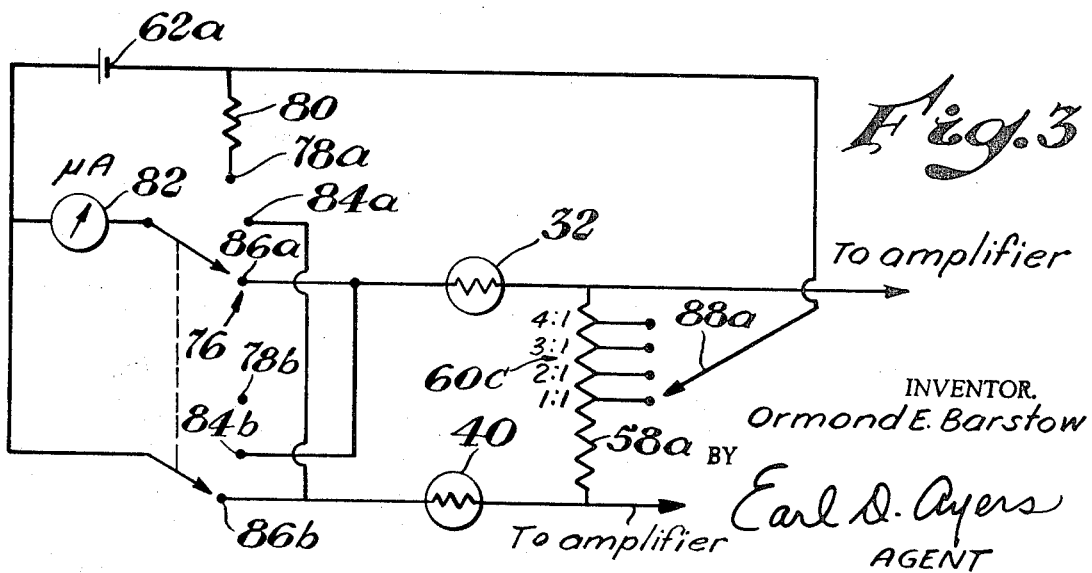
FIG. 3 is a more complex circuit suitable for use with the apparatus of FIG. 1.

In FIG. 3, the bridge circuit is essentially that of FIG. 2 except that a tapped resistor 60c replaces resistors 60a, 60b and power from the battery 62a is applied to the junction between the photoresistive elements 32, 40 through two poles of a double pole, triple throw switch, indicated generally by the numeral 76.

When the switch 76 is coupled to the pair 78a, 78b, the resistance 80 serves to limit current from the battery 62a, the meter 82 thus being used as the indicator means of a battery check device. In fact, with a suitable meter and resistance 80, the meter can read the voltage output of battery 62a.

When the switch 76 is coupled to pair 84a, 84b, voltage is applied across the photoresistor elements 32 and 40 with the microammeter 82 measuring the current through the photoresistor element 40.

When the switch is connected to pairs 86a, 86b, voltage is applied to the photoresistor elements 32 and 40 with the meter 82 measuring the current through photoresistor element 32.

In operation, liquid whose refractive index is to be measured is brought into the housing 20. Usually the housing is provided with a thermostatically controlled bath to hold the sample temperature at a predetermined temperature.

Light from the source 10 passes through the sample, some of it striking the face 16 of the prism 18 at grazing incidence, and some of it striking the face 16 at a slight angle.

With the face of the prism covered with sample liquid and thus illuminated, an observer looking from the position of the eye 54, for example (the assembly 34 being depressed manually so as to provide an unobstructed path for the light emerging from the objective lens to the eye piece), sees a field in which the upper portion is light and the lower portion is dark. The horizontal dividing line between the light (upper portion) and dark (power portion) of the split field is referred to usually by the term light-dark boundary and is delineated by the objective lens bringing the rays of the refracted light beam to a focus in the plane of the scale lens.

The vertical position of the light-dark boundary on the scale lens depends upon the index of refraction of the material of the prism 18, the angle of the prism face 16 with respect to the prism axis and the index of refraction of the sample. For a given refractive index of the sample, the prism 18 may be chosen (angle and refractive index) to bring the light-dark boundary to the center of the scale lens or roughly to any position on the scale lens desired.

The eye lens 52 serves as a magnifier to permit accurate reading of the position of the light-dark boundary with respect to the scale engraved on the scale lens. The reading thus obtained can, by suitable calibration, be interpreted to give sample refractive index.

The brightness of the light portion of the split field compared to that of the dark portion is a variable but oftentimes is in the order of 10 to 1 and may go as high as 100 to 1.

Part of the light (about 8 percent, for example) passing through the prism 18, filter 22 and objective lens is reflected downwardly by the plate 26, passing through the relatively wide reference slit 38 and impinging on the photocell 40.

The remainder of the light impinging on the plate 26 passes through and is reflected by reflecting element 28 downwardly and focuses in the plane of slit 30 which is in fixed position with respect to the prism 28. The light focused in the plane of slit 30 forms a light-dark field in this plane with the light portion on the left in FIG. 1 and the dark portion on the right.

Likewise, the light reflected by plate 26 is focused in the plane of the reference slit 38 forming in this plane, the light-dark field with the light portion on the left and the dark portion on the right in FIG. 1.

Note that using total reflecting prism 28 and positioning slit 30 and photocell 32 as shown in FIG. 1 is equivalent optically to putting slit 30 in the plane of the scale lens and photocell 32 to the right of the slit without the total reflecting prism; and that rocking of the pivoted assembly about pivot 36 is then equivalent to moving the slit up and down across the light-dark field in the plane of the scale lens with the photocell moving up and down with the slit (or more accurately, moving in a slight arc about point 36).

Refer to FIGS. 1 and 2 in which the switch 88 is connected to the junction between resistors 58 and 60a (the 1:1 position) and assume that the reference slit 38 is adjusted manually so that it is in the dark field.

To balance the bridge, the measuring slit is first moved (by rocking assembly 34) into the same part of the dark field occupied by the reference slit and the opening in the reference slit is adjusted so that the readings of meters 64, 66 are equal, or until the motor stops. The reference slit must be opened wider than the measuring slit because a much smaller amount of light is deflected by plate 26 to the reference slit than is deflected to the measuring slit 30 by the prism 28. Normally this balancing of the bridge does not need to be repeated unless the dark field brightness changes markedly with time.

Once the bridge is balanced, the switch 88 (or 88a in FIG. 3) is set to the point marked 2:1. The bridge is now not balanced and the motor 70, driven by the amplifier 68, will run, driving slit 30 toward the light field until the input to the amplifier is zero which will occur when the slit starts to cross the light-dark boundary. Then it will stop and the pen will record the refractive index of the sample on a suitable chart. If the refractive index changes the slit will be driven one way or the other to keep it in coincidence with the light-dark boundary, and the pen will continue to read the refractive index of the sample.

The ratio of 2:1 – 4:1 or more of the resistance legs of the bridge is chosen to give optimum performance of the servo system in positioning the slit on the light-dark dividing line and depends on relative brightness of the light and dark fields and sharpness of the dividing line.

The circuit of FIG. 3 permits checking the current from both the photoresistive elements and the voltage from the power supply with only one meter. Also, a greater number of taps on the resistance legs of the bridge permit operation over a wider range of light intensities in the split field.

Other readout devices than a pen 74 may be used in connection with the apparatus, as will be recognized by those skilled in the art.

What is claimed is:

1. Refractometer apparatus comprising a stationary light refracting prism for refracting a beam of light, said prism having a light receiving surface and a light emergent surface, said light receiving surface being adapted to being covered by a sample whose refractive index is to be obtained, a light source opposite the light receiving surface adapted to direct a beam of light through the sample onto the light receiving surface at grazing incidence to produce a refracted light beam, said refracted light beam having a dark area, a light area and a light-dark boundary on being brought to a focus, means adapted to bring to a focus the refracted light so as to delineate the said dark area, light area and light-dark boundary, reference light sensitive and light limiting means, said light sensitive means being aligned with said light limiting means and being adapted to develop an electrical output signal in response to impingement thereon of light from said refracted light beam, fixed positioned light deflecting means disposed in the path of said refracted light for directing focused refracted light from said dark area to said reference light limiting means and light sensitive means, measuring light limiting and light sensitive means, said measuring light sensitive means being aligned with said measuring light limiting means and being adapted to develop an electrical output signal in response to impingement thereon of light from said refracted light beam, means for scanning light from said refracted light beam across said measuring light sensitive means, circuit means for comparing the output signals from said two light sensitive means and for deriving an output which is a function of the two signals, amplifier means responsive to said circuit output and coupled to said circuit, a servo motor, said servo motor being coupled to said amplifier means, said motor being controlled by said servo amplifier and being mechanically coupled to said means for scanning and to readout means, said servo amplifier controlling the movement of said means for scanning until said circuit output is zero as a result of the light impinging on said reference and measuring light-sensitive means, said circuit output being zero when said measuring light limiting means coincides with said light-dark boundary.

2. Refractometer apparatus in accordance with claim 1, wherein said means adapted to bring to a focus the refracted light is a lens.

3. Refractometer apparatus in accordance with claim 1, wherein said reference light limiting means is a manually adjustable slit element.

4. Refractometer apparatus in accordance with claim 1, wherein said reference and measuring light sensitive means are photo-resistive elements.

5. Refractometer apparatus in accordance with claim 1, wherein said readout means is a recorder whose pen is mechanically coupled to said motor.

6. Refractometer apparatus in accordance with claim 1, wherein said circuit means is a bridge circuit including a pair of resistance arms and said reference and light sensitive means and measuring light sensitive means forming a pair of opposing arms thereof and said servo motor has its input coupled across each junction between a light sensitive means and a resistive arm.

7. Refractometer apparatus in accordance with claim 1, wherein an additional light deflecting means is disposed in the path of said refracted light beam to thereby deflect light to said measuring light limiting and sensitive means.

8. Refractometer apparatus in accordance with claim 7, wherein said means for scanning includes pivotal mounting means for rotating said additional light deflecting means and said measuring light limiting means and light sensitive means around a common axis, near to said means adapted to bring said refracted light to a focus.

9. Refractometer apparatus in accordance with claim 1, wherein both said light limiting means are slit elements.

10. Refractometer apparatus in accordance with claim 1, wherein the circuit for comparing the signals from the two light sensitive means is adjustable so the relation between the signals from the two light sensitive means at the balance point may be varied.

* * * * *

PO-1050
(5/69)

UNITED STATES PATENT OFFICE
CERTIFICATE OF CORRECTION

Patent No. 3,738,757          Dated June 12, 1973

Inventor(s) Ormond E. Barstow

It is certified that error appears in the above-identified patent and that said Letters Patent are hereby corrected as shown below:

Column 2, line 40, change "photosensitive" to -- photoresistive --.

Signed and sealed this 14th day of May 1974.

(SEAL)
Attest:

EDWARD M.FLETCHER,JR.
Attesting Officer

C. MARSHALL DANN
Commissioner of Patents